United States Patent
Kawauchi

(10) Patent No.: US 12,422,240 B2
(45) Date of Patent: Sep. 23, 2025

(54) CALIBRATION METHOD AND NON-TRANSITORY COMPUTER-READABLE STORAGE MEDIUM STORING CALIBRATION PROGRAM FOR CONTACT TOOL SENSOR IN MACHINE TOOL, AND MACHINE TOOL

(71) Applicant: OKUMA CORPORATION, Niwa-Gun (JP)

(72) Inventor: Daichi Kawauchi, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 338 days.

(21) Appl. No.: 17/820,898

(22) Filed: Aug. 19, 2022

(65) Prior Publication Data

US 2023/0056310 A1    Feb. 23, 2023

(30) Foreign Application Priority Data

Aug. 23, 2021    (JP) .................. 2021-135871

(51) Int. Cl.
*G01B 5/008* (2006.01)
*B08B 13/00* (2006.01)
(Continued)

(52) U.S. Cl.
CPC .............. *G01B 5/008* (2013.01); *B08B 13/00* (2013.01); *B23Q 23/00* (2013.01); *G05B 19/401* (2013.01);
(Continued)

(58) Field of Classification Search
CPC .. B08B 13/00; B08B 3/02; B08B 5/02; B23Q 23/00; B23Q 2717/00; G01B 21/042;
(Continued)

(56) References Cited

U.S. PATENT DOCUMENTS

| 2014/0123740 A1* | 5/2014 | Yoshikawa | .......... G05B 19/406 |
| | | | 73/104 |
| 2019/0294144 A1* | 9/2019 | Takahara | ............ G05B 23/0221 |
| 2022/0184765 A1* | 6/2022 | Maxted | ..................... G01B 5/28 |

FOREIGN PATENT DOCUMENTS

| EP | 1998137 B1 * | 9/2017 | ........... G01B 21/042 |
| JP | 6400817 B2 | 10/2018 | |

* cited by examiner

*Primary Examiner* — Yoshihisa Ishizuka
(74) *Attorney, Agent, or Firm* — BURR PATENT LAW, PLLC

(57) ABSTRACT

A method for calibrating a positional relation between a main spindle and a contact tool sensor attached to a table in a machine tool. The method includes: mounting a reference tool on the main spindle and obtaining measurement position coordinates as respective tool sensor measurement values, the measurement position coordinates being of a distal end of the reference tool in at least two different measurement regions on an upper surface of the contact tool sensor; outputting predetermined difference values based on the respective tool sensor measurement values; determining an abnormality when the difference values are compared with preliminarily set acceptable values and at least one of the difference values are out of the acceptable values; and calibrating a positional relation between the main spindle and the contact tool sensor based on the respective tool sensor measurement values when the abnormality is not determined at the determining of abnormality.

9 Claims, 14 Drawing Sheets

(51) Int. Cl.
*B23Q 23/00*     (2006.01)
*G05B 19/401*    (2006.01)

(52) U.S. Cl.
CPC .................... *B23Q 2717/00* (2013.01); *G05B 2219/31304* (2013.01)

(58) Field of Classification Search
CPC .................. G01B 5/008; G05B 19/401; G05B 2219/31304; G05B 2219/37581; G05B 2219/40581
See application file for complete search history.

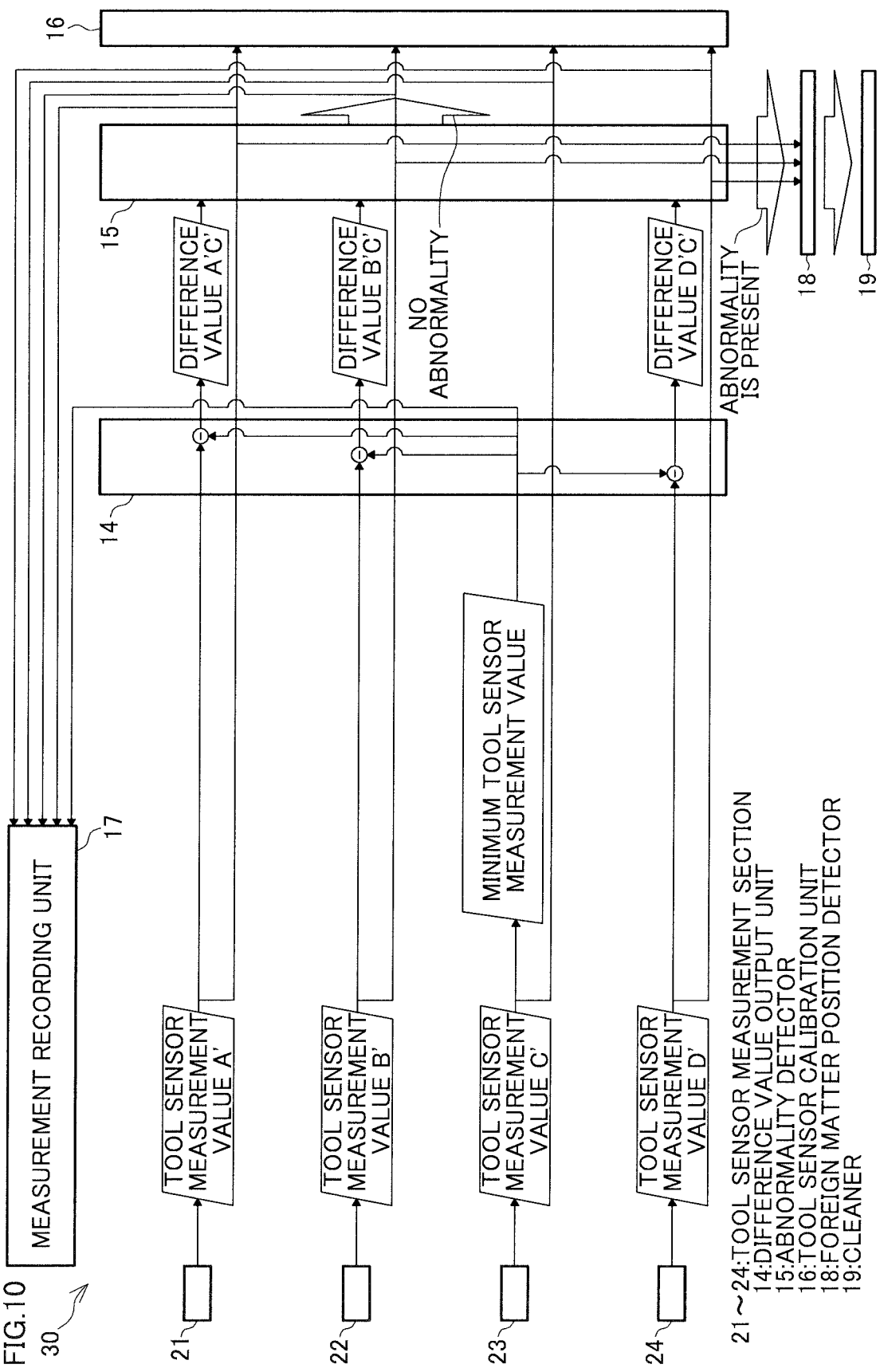

ently claims the benefit of Japanese Patent
Application Number 2021-135871 filed on Aug. 23, 2021,
the entirety of which is incorporated by reference.

CALIBRATION METHOD AND NON-TRANSITORY COMPUTER-READABLE STORAGE MEDIUM STORING CALIBRATION PROGRAM FOR CONTACT TOOL SENSOR IN MACHINE TOOL, AND MACHINE TOOL

CROSS REFERENCE TO RELATED APPLICATION

This application claims the benefit of Japanese Patent Application Number 2021-135871 filed on Aug. 23, 2021, the entirety of which is incorporated by reference.

FIELD OF THE INVENTION

The present disclosure relates to a method and a non-transitory computer-readable storage medium storing a calibration program for calibrating a contact tool sensor used in a machine tool, and the machine tool.

BACKGROUND OF THE INVENTION

In a machine tool controlled by a numerical control unit, a tool sensor measures, for example, a dimension of a tool and a position of a cutting edge mounted on a main spindle when processing is performed.

The tool and the tool sensor have their shapes and positional relations changed due to a thermal displacement of the machine caused, for example, by a room temperature change, a thermal displacement caused, for example, by a heat generation by the main spindle, a secular change, and the like. Therefore, it is necessary to calibrate the tool sensor when processing with high accuracy is maintained in processing over a long period of time.

Generally, a calibration of a contact tool sensor, for example, a touch sensor, is performed such that a tool used in setting an origin of a workpiece coordinate system or a reference tool with a known length is brought into contact with the contact tool sensor secured to a table or the like, and a position of the main spindle is recorded when a signal emitted from the contact tool sensor when the contact is made is detected.

However, in an actual cutting work of a machine tool, chips and a cutting fluid (hereinafter referred to as a foreign matter) sometimes fall on the contact tool sensor. The foreign matter causes an error in the calibration of the contact tool sensor, and the error causes an error in the measured tool length. As a countermeasure, there is a method in which the contact tool sensor is cleaned with an air blower before the measurement. However, it is difficult to completely remove the foreign matter.

Therefore, in the conventional method, to detect a foreign matter, an operator has visually observed to find the foreign matter between an interval of processing.

On the other hand, for example, as Japanese Patent No. 6400817 shows, there has been known a detection method using a captured image by a camera. Here, it is shown a method for detecting a position at which a foreign matter is present from the captured image of a workpiece installation region and focusing on cleaning the detected position.

However, with the method in which an operator visually observes to find a foreign matter between an interval of processing as conventional manner, productivity is likely to be lowered due to an interruption of processing.

With the method of Japanese Patent No. 6400817, cost is likely to be increased due to needing a camera inside a machine tool that takes images of a processing region, and moreover, further needing a countermeasure so as to avoid a foreign matter from attaching on a lens of the camera.

Therefore, an object of the present disclosure is to provide a calibration method and a non-transitory computer-readable storage medium storing a calibration program of a contact tool sensor in a machine tool that allows detecting a foreign matter without needing a special device for a contact tool sensor, and the machine tool.

SUMMARY OF THE INVENTION

In order to achieve the above-described object, a first configuration of the disclosure is a method for calibrating a positional relation between a main spindle and a contact tool sensor attached to a table in a machine tool. The machine tool has three or more translational axes, the main spindle to which a tool is mountable, the table, and a numerical control unit that controls the translational axes and the main spindle. The method includes: mounting a reference tool on the main spindle and obtaining measurement position coordinates as respective tool sensor measurement values, the measurement position coordinates being of a distal end of the reference tool in at least two different measurement regions on an upper surface of the contact tool sensor; outputting predetermined difference values based on the respective tool sensor measurement values; determining an abnormality when the difference values are compared with preliminarily set acceptable values and at least one of the difference values are out of the acceptable values; and calibrating a positional relation between the main spindle and the contact tool sensor based on the respective tool sensor measurement values when the abnormality is not determined at the determining of abnormality.

Another aspect of the first configuration of the disclosure, which is in the above configuration, further includes a cleaning step of cleaning the upper surface of the contact tool sensor when the abnormality is determined at the abnormality detection step.

In another aspect of the first configuration of the disclosure, which is in the above configuration, the cleaning step includes cleaning at least the measurement region where the tool sensor measurement value related to the difference value out of the acceptable value is obtained.

In another aspect of the first configuration of the disclosure, which is in the above configuration, the tool sensor measurement step, the difference value output step, and the abnormality detection step are performed again after performing the cleaning step, and when the abnormality is determined at the abnormality detection step again, a process of performing the cleaning step again is repeated, and when the number of determinations of the abnormality at the abnormality detection step reaches a predetermined threshold, the process is terminated and a notification step of notifying thereof is performed.

In another aspect of the first configuration of the disclosure, which is in the above configuration, the difference value output step includes outputting a difference between the respective tool sensor measurement values as the difference value.

Another aspect of the first configuration of the disclosure, which is in the above configuration, further includes a reference value recording step and a displacement value output step. The reference value recording step is of recording measurement position coordinates of the distal end of the reference tool in the plurality of measurement regions as respective tool sensor reference values while no foreign matter is attached on the upper surface of the contact tool sensor or the reference tool, before performing the difference value output step. The displacement value output step is of outputting differences between the respective tool sensor reference values and the respective tool sensor measurement values in the measurement regions same as the measurement regions of the respective tool sensor reference values, as respective tool sensor displacement values. The difference value output step includes outputting the differences between the respective tool sensor displacement values as the difference values.

In another aspect of the first configuration of the disclosure, which is in the above configuration, the difference value output step assumes that a direction in which the main spindle approaches the contact tool sensor is a negative direction and a minimum value among the respective tool sensor measurement values is a minimum tool sensor measurement value, and includes outputting differences between the tool sensor measurement values other than the tool sensor measurement value related to the minimum value and the minimum tool sensor measurement value as the difference values.

Another aspect of the first configuration of the disclosure, which is in the above configuration, further includes a reference value recording step and a displacement value output step. The reference value recording step is of recording measurement position coordinates of the distal end of the reference tool in the plurality of measurement regions as respective tool sensor reference values while no foreign matter is attached on the upper surface of the contact tool sensor or the reference tool, before performing the difference value output step. The displacement value output step is of outputting differences between the respective tool sensor reference values and the respective tool sensor measurement values in the measurement regions same as the measurement regions of the respective tool sensor reference values, as respective tool sensor displacement values. The difference value output step assumes that a direction in which the main spindle approaches the contact tool sensor is a negative direction and a minimum value among the respective tool sensor displacement values is a minimum tool sensor displacement value, and includes outputting differences between the tool sensor displacement values other than the tool sensor displacement value related to the minimum value and the minimum tool sensor displacement value as the difference values.

A second configuration of the disclosure is a non-transitory computer-readable storage medium storing a calibration program of a contact tool sensor in a machine tool. The machine tool has three or more translational axes, a main spindle to which a tool is mountable, a table, and a numerical control unit that controls the translational axes and the main spindle. The calibration program causes the numerical control unit to perform the calibration method of the contact tool sensor according to any one of the first configuration of the disclosure while a reference tool is mounted on the main spindle and the contact tool sensor is installed to the table.

A third configuration of the disclosure is a machine tool that has three or more translational axes, a main spindle to which a tool is mountable, a table, and a numerical control unit that controls the translational axes and the main spindle. The machine tool has a tool sensor measurement unit, a difference value output unit, an abnormality detector, and a tool sensor calibration unit. The tool sensor measurement unit obtains measurement position coordinates as respective tool sensor measurement values while a reference tool is mounted on the main spindle and a contact tool sensor is installed to the table. The measurement position coordinates are of a distal end of the reference tool in at least two different measurement regions on an upper surface of the contact tool sensor. The difference value output unit outputs predetermined difference values between the respective tool sensor measurement values. The abnormality detector determines an abnormality when the difference values are compared with preliminarily set acceptable values and at least one of the difference values are out of the acceptable values. The tool sensor calibration unit calibrates a positional relation between the main spindle and the contact tool sensor based on the respective tool sensor measurement values when the abnormality is not determined by the abnormality detector.

With the present disclosure, a foreign matter attachment on a contact tool sensor can be detected during processing without needing a determination operation by a visual observation by an operator or a special device. Thus, while reducing a workload of an operator and reducing a time loss caused by an interruption of processing, checking if a calibration of the contact tool sensor can be accurately done. Moreover, since a measurement system or the like by a camera is not necessary, it can be achieved at a comparatively low price.

In particular, when it is configured that the contact tool sensor is cleaned when the abnormality determination is made, the contact tool sensor can be accurately calibrated after removal of an effect caused by the foreign matter attachment. Thus, a length of a tool used for processing can be accurately measured, thereby allowing maintaining processing accuracy in processing.

BRIEF DESCRIPTION OF THE DRAWINGS

FIG. 10 is a function block diagram of a numerical control unit in the embodiment 3.

DETAILED DESCRIPTION OF THE INVENTION

The following describes embodiments of the present disclosure based on the drawings.

A description of an embodiment 1 is provided below.

Figure 1:
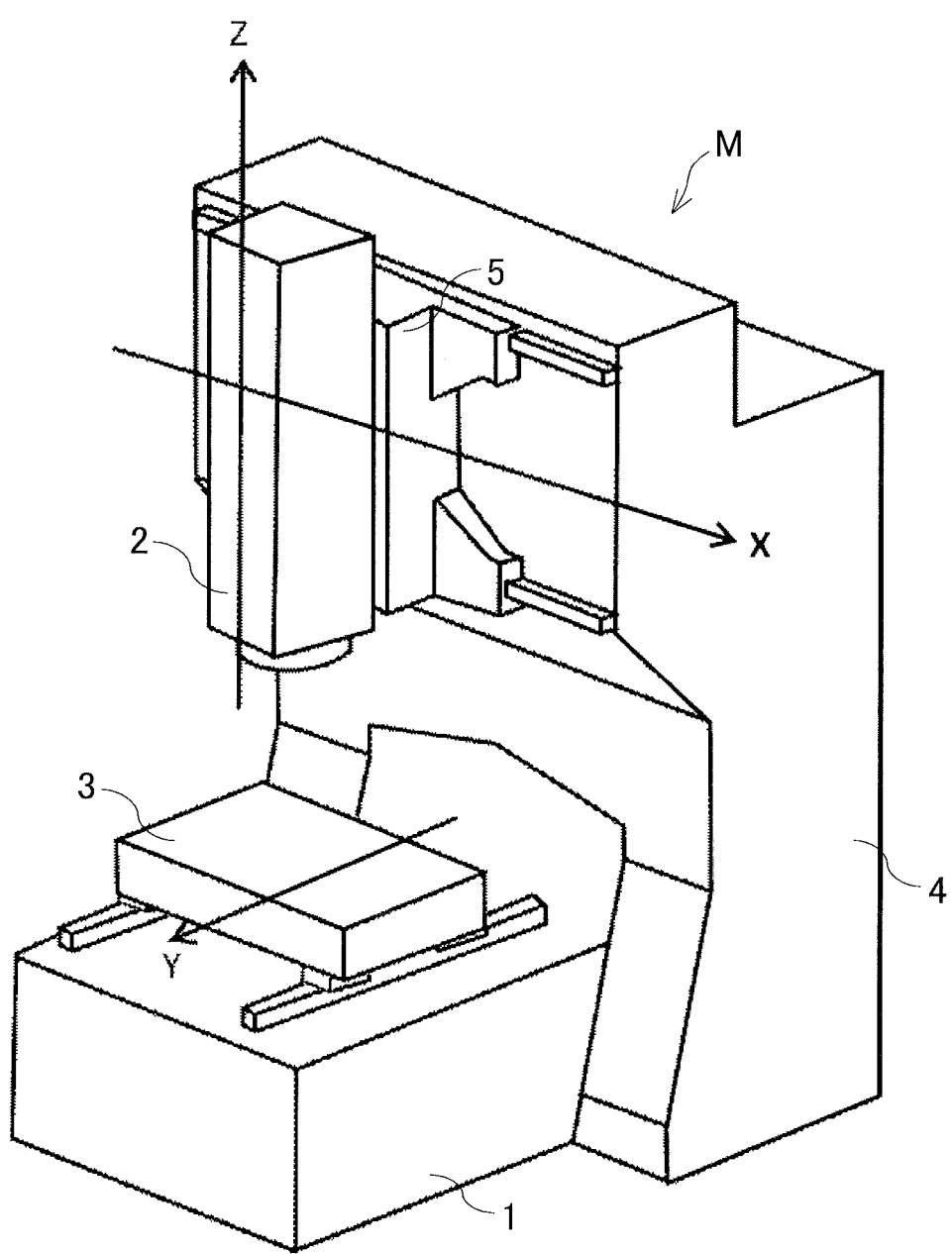
FIG. 1 is a schematic diagram of a machining center.

FIG. 1 is a schematic diagram of a machining center M that has three translational axes perpendicular to one another, which is one embodiment of a machine tool. A main spindle head 2 (main spindle) is allowed to move with two degrees of freedom for translation with respect to a bed 1 by an X-axis and a Z-axis that are translational axes and are perpendicular to one another. A table 3 is allowed to move with one degree of freedom for translation with respect to the bed 1 by a Y-axis that is a translational axis and is perpendicular to the X-axis and the Z-axis. Accordingly, the main spindle head 2 is allowed to move with three degrees of freedom for translation with respect to the table 3. The movement of the XYZ-axes is performed by servomotor driving controlled by a numerical control unit 30, which will be described later. A workpiece is processed while the workpiece is secured on the table 3, a tool is mounted on the main spindle head 2 and the main spindle head 2 is rotated, and a relative position and a relative posture between the workpiece and the tool is controlled.

As a machine tool related to the present disclosure, the number of axes is not limited to three, but may be four or five. Furthermore, the machine tool may have a mechanism having the table 3 and the main spindle head 2 with one or more degrees of freedom for rotation by a rotation shaft.

Figure 2:
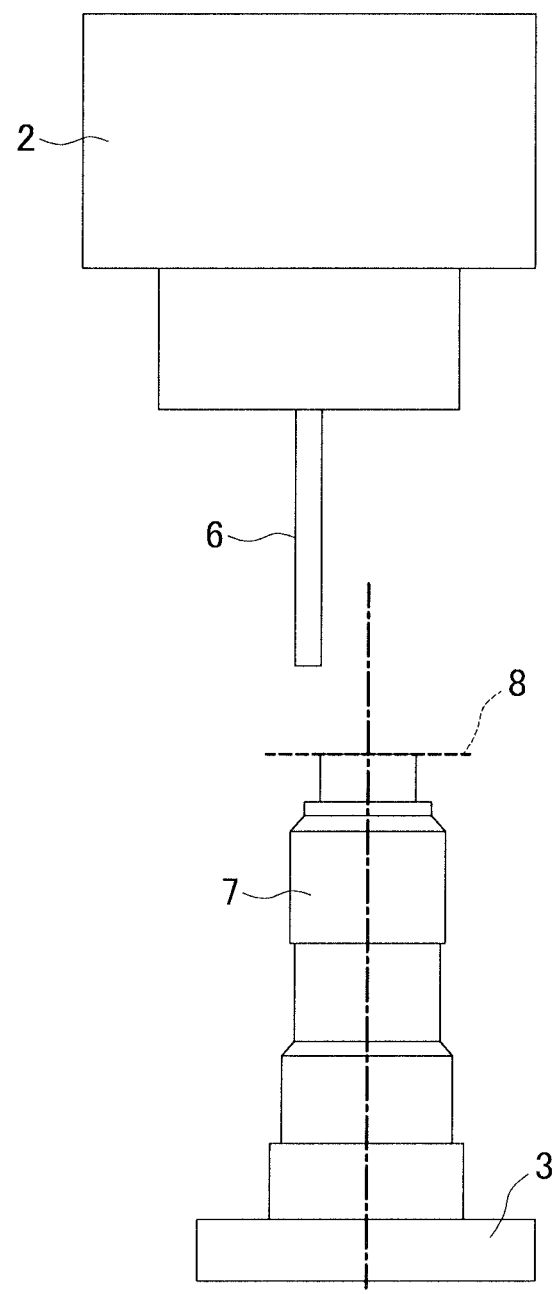
FIG. 2 is a schematic diagram of an exemplary device that performs a measurement in an embodiment 1.

FIG. 2 is a schematic diagram of a device that performs a measurement using a contact tool sensor (hereinafter simply referred to as a "tool sensor") 7 installed on the table 3. The numerical control unit 30 controls a relative position of the XYZ-axes between the main spindle head 2 and the table 3, and thus, a relative positional relation between a reference tool 6 attached to the main spindle head 2 and the tool sensor 7 can be changed. The tool sensor 7 emits a signal by bringing a distal end of the reference tool 6 into contact with a reaction surface 8 of the tool sensor 7. A relative position coordinate of the XYZ-axes between the main spindle head 2 and the table 3 and a length of the reference tool 6 at the point when the signal is emitted allow to detect a relative position coordinate between the reaction surface 8 and the table 3 in an axial direction perpendicular to the reaction surface 8. The reaction surface 8 serves as a reference surface in measuring a tool length. The tool sensor 7, the reference tool 6, and the numerical control unit 30 function as a tool sensor measurement unit of the present disclosure. Hereinafter, the direction in which the main spindle head 2 approaches the tool sensor 7 is a negative direction.

Assume that the reference tool 6 attached to the main spindle head 2 has no deformation. Even if the machine deforms and the positional relation between the main spindle head 2 and the reaction surface 8 of the tool sensor 7 changes, the reference surface in measuring the tool length can be calibrated by bringing the distal end of the reference tool 6 into contact with the reaction surface 8 and measuring again the relative position of the reaction surface 8 in the axial direction perpendicular to the reaction surface 8.

Figure 3:
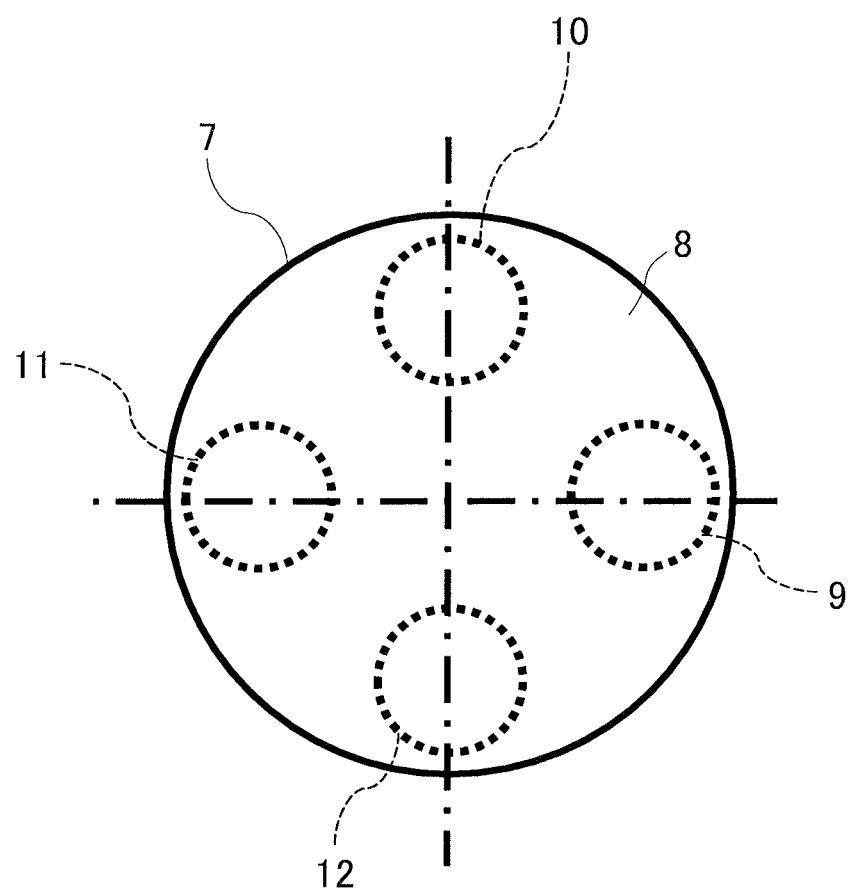
FIG. 3 illustrates an example of measurement regions when viewed in a direction perpendicular to a reaction surface of a contact tool sensor in the embodiment 1.

FIG. 3 illustrates an example of measurement regions when viewed in a direction perpendicular to the reaction surface 8. In the embodiment, the reference tool 6 is in contact only with a part of the reaction surface 8, and a relative position of the reaction surface 8 is measured in two or more regions without overlapping the measurement regions. Here, measurements in four different measurement regions are shown as one example, and as illustrated in dotted circles, measurement sections in the respective measurement regions are a tool sensor measurement section 9, a tool sensor measurement section 10, a tool sensor measurement section 11, and a tool sensor measurement section 12.

Figure 4:
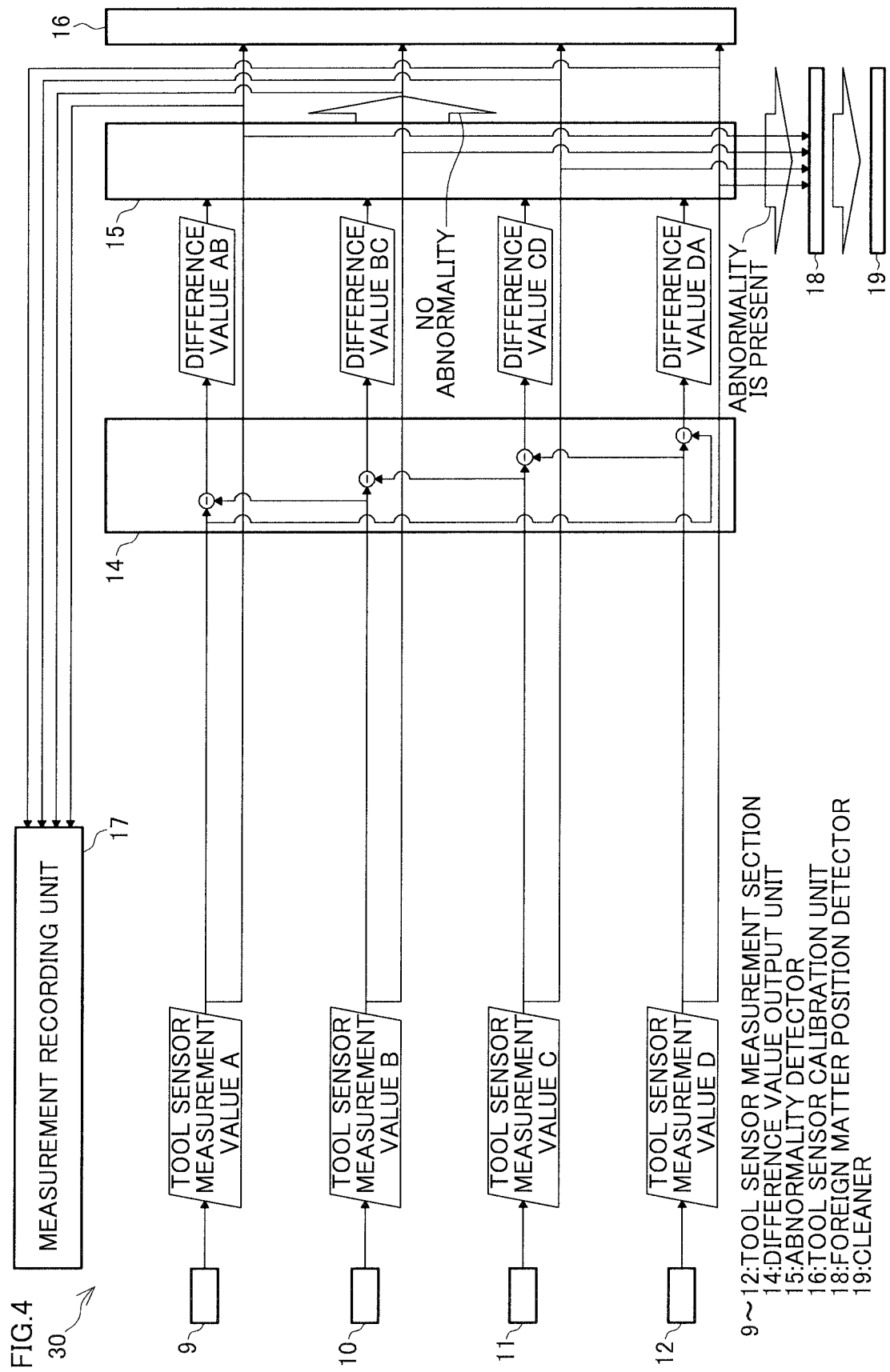
FIG. 4 is a function block diagram of a numerical control unit in the embodiment 1.

FIG. 4 is a function block diagram of a part related to a calibration of the tool sensor 7 in the numerical control unit 30. The numerical control unit 30 includes a difference value output unit 14, an abnormality detector 15, a tool sensor calibration unit 16, a measurement recording unit 17, a foreign matter position detector 18, and a cleaner 19 as a calibration functional unit.

The difference value output unit 14 outputs predetermined difference values based on tool sensor measurement values A to D output from the respective tool sensor measurement sections 9 to 12, as a difference value output unit of the present disclosure.

The abnormality detector 15 determines presence/absence of an abnormality based on the output difference values, as an abnormality detector of the present disclosure.

The tool sensor calibration unit 16 calibrates the reference surface when the abnormality detector 15 determines that there is no abnormality, as a tool sensor calibration unit of the present disclosure.

The measurement recording unit 17 records the tool sensor measurement values A to D and the like.

The foreign matter position detector 18 detects a position of a foreign matter in the measurement region when the abnormality detector 15 determines that there is an abnormality.

The cleaner 19 cleans the measurement region where the foreign matter detected by the foreign matter position detector 18 is present.

Figure 5:
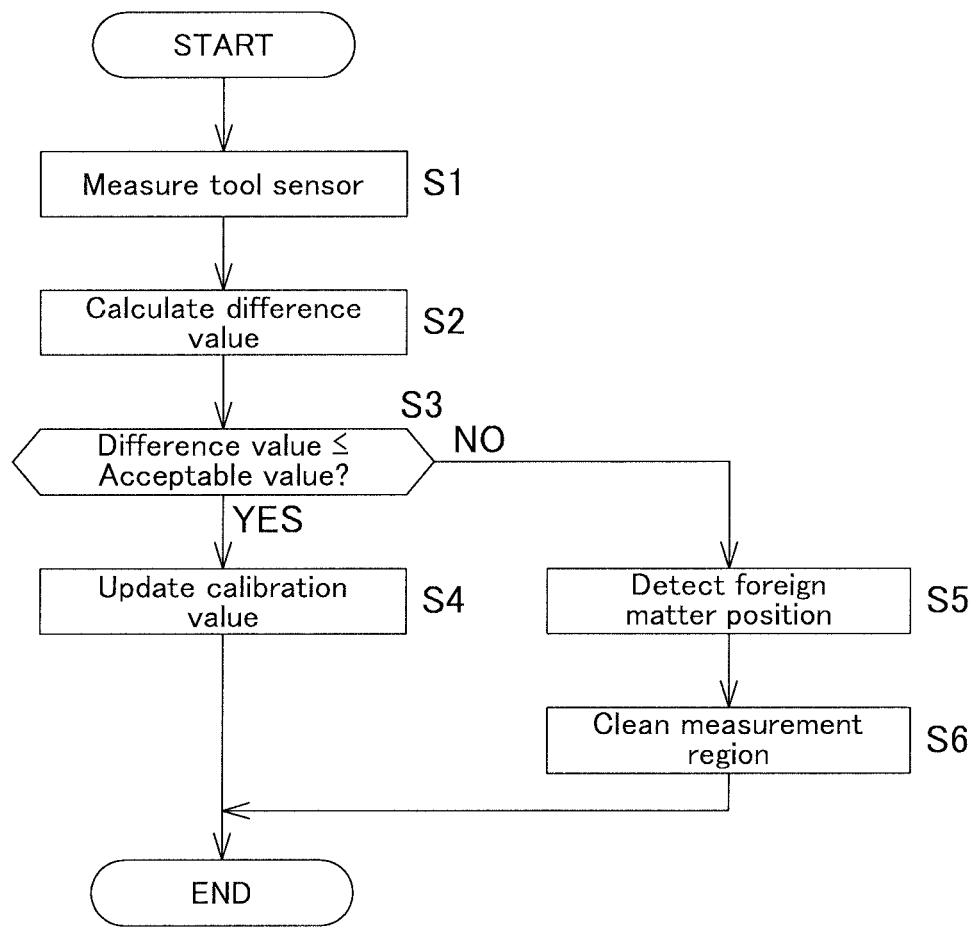
FIG. 5 is a flowchart of a calibration method of the contact tool sensor in the embodiment 1.

The numerical control unit 30 performs the calibration method of the tool sensor 7 illustrated in the flowchart in FIG. 5 according to a calibration program stored in a storage unit.

First, at S1, the distal end of the reference tool 6 is brought into contact with the four measurement regions on the reaction surface 8 of the tool sensor 7, and the relative positions of the reaction surface 8 in the axial direction perpendicular to the reaction surface 8 are each measured (a tool sensor measurement step). The respective measurement results of the relative positions of the reaction surface 8 at the tool sensor measurement sections 9 to 12 are a tool sensor measurement value A, a tool sensor measurement value B, a tool sensor measurement value C, and a tool sensor measurement value D. Each of the tool sensor measurement values A to D is input to the difference value output unit 14.

At S2, the difference value output unit 14 calculates a difference value AB between the tool sensor measurement value A and the tool sensor measurement value B, a difference value BC between the tool sensor measurement value B and the tool sensor measurement value C, a difference value CD between the tool sensor measurement value C and the tool sensor measurement value D, and a difference value DA between the tool sensor measurement value D and the tool sensor measurement value A, as respective absolute values (a difference value output step). Each of the difference values output from the difference value output unit 14 is input to the abnormality detector 15.

At S3, the abnormality detector 15 determines whether the respective difference values are less than or equal to preliminarily set acceptable values or not (an abnormality detection step).

When all the respective difference values are less than or equal to the acceptable values, it is determined that there is no abnormality, and the tool sensor measurement values A to D are output to the tool sensor calibration unit 16 and they are recorded in the measurement recording unit 17.

At S4, the tool sensor calibration unit 16 updates calibration values of the reference surface in measuring the tool length based on the tool sensor measurement values A to D (a tool sensor calibration step).

On the other hand, when any of the difference values exceeds the acceptable value in the determination at S3, it is determined that there is an abnormality, and the determination result is output to the foreign matter position detector 18.

At S5, the foreign matter position detector 18 determines that the measurement region related to the tool sensor measurement section determined to have an abnormality in the difference values (exceeded the acceptable value) has a foreign matter, and outputs the determination result to the cleaner 19.

At S6, the cleaner 19 performs cleaning, such as a fluid injection, on the measurement region determined to have the foreign matter by the foreign matter position detector 18 (a cleaning step).

Thus, with the calibration method and the non-transitory computer-readable storage medium storing the calibration program of the tool sensor 7 of the above-described embodiment 1, and the machining center M, the predetermined difference values are output based on the tool sensor measurement values A to D to compare the difference values with the acceptable values. When at least one of the difference values are out of the acceptable values, it is determined that there is an abnormality. When it is determined that there is no abnormality, a positional relation between the main spindle head 2 and the tool sensor 7 is calibrated based on the respective tool sensor measurement values. Therefore, the attachment of the foreign matter on the tool sensor 7 can be detected during processing without needing a visual observation operation by an operator or a special device. Thus, while reducing a workload of an operator and reducing a time loss caused by an interruption of processing, it is allowed to check whether the tool sensor 7 is accurately calibrated.

The following describes another embodiment of the present disclosure. However, the configuration portions which are the same as those of the embodiment 1, such as the configuration of the machining center, are attached with the same reference numerals to omit the overlapping descriptions.

A description of an embodiment 2 is provided below.

Figure 6:
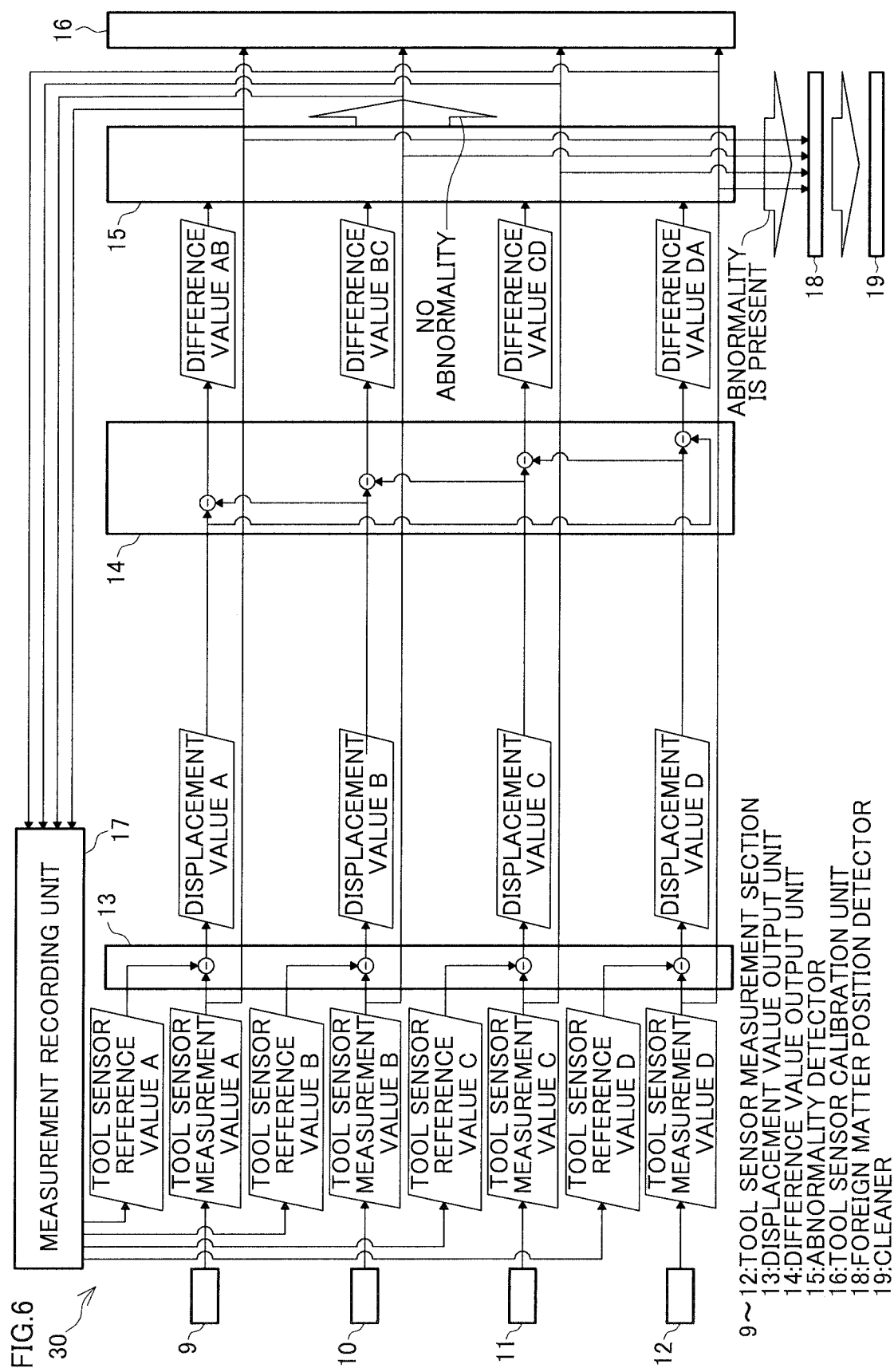
FIG. 6 is a function block diagram of a numerical control unit in an embodiment 2.

FIG. 6 is a function block diagram illustrating another example of the portion related to the calibration of the tool sensor 7 in the numerical control unit 30. The numerical control unit 30 shown in FIG. 6 is different from the embodiment 1 in that it includes a displacement value output unit 13 that calculates differences between the respective tool sensor measurement values and the respective tool sensor reference values as displacement values.

Figure 7:
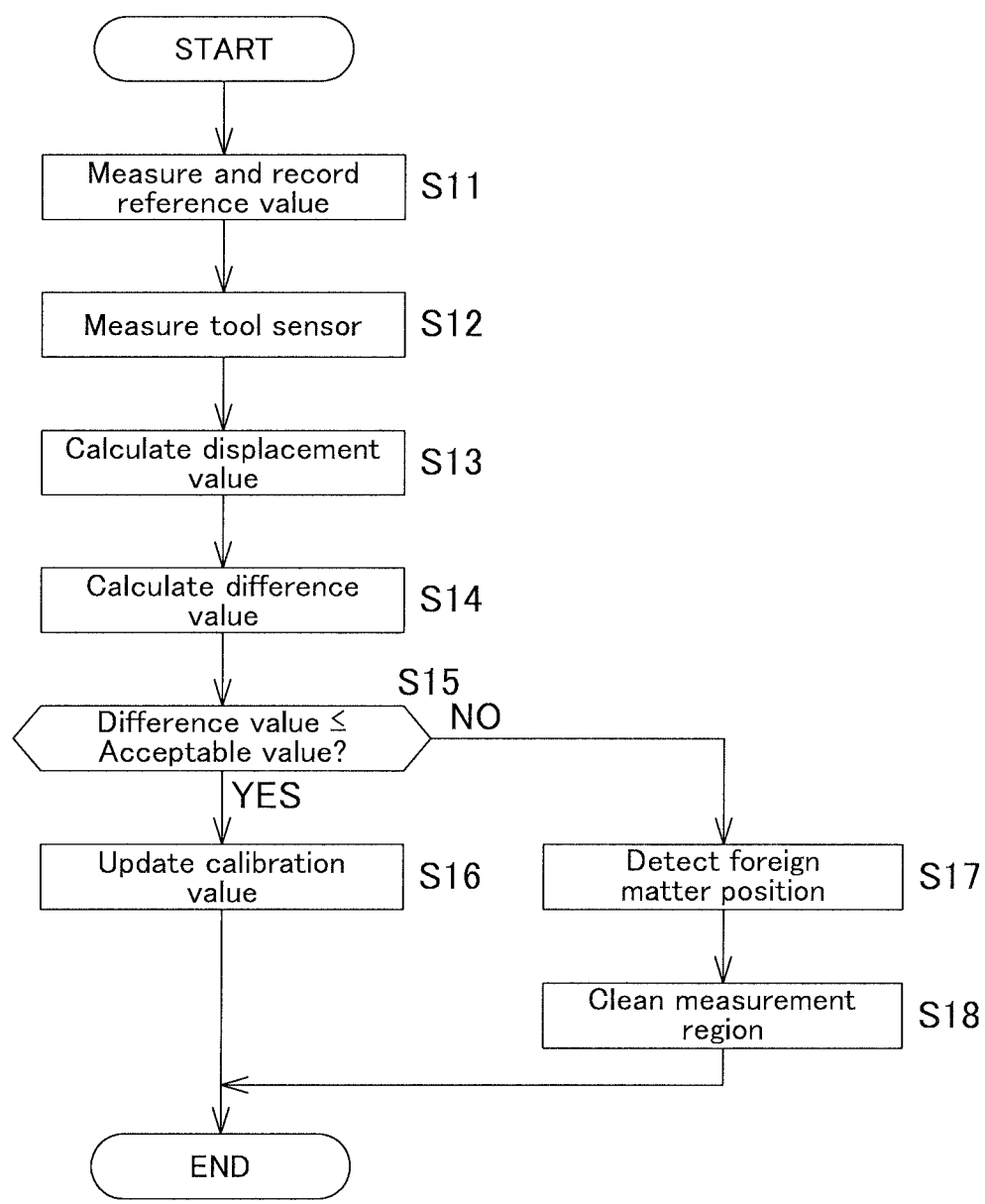
FIG. 7 is a flowchart of a calibration method of a contact tool sensor in the embodiment 2.

In the embodiment 2, as illustrated in the flowchart in FIG. 7, first, at S11, in a state where no foreign matter is attached on the tool sensor measurement sections 9 to 12 and the reference tool 6, measurement position coordinates of the distal end of the reference tool 6 in the respective measurement regions are measured. Then, the measurement position coordinates are recorded in the measurement recording unit 17 as a tool sensor reference value A, a tool sensor reference value B, a tool sensor reference value C, and a tool sensor reference value D (a reference value recording step).

Next, at S12, the respective measurement regions of the tool sensor 7 are measured to obtain the tool sensor measurement values A to D.

Next, at S13, the displacement value output unit 13 calculates a difference between the tool sensor measurement value A and the tool sensor reference value A, a difference between the tool sensor measurement value B and the tool sensor reference value B, a difference between the tool sensor measurement value C and the tool sensor reference value C, and a difference between the tool sensor measurement value D and the tool sensor reference value D, each of which is of the same measurement region (a displacement value output step). The respective differences are a displacement value A, a displacement value B, a displacement value C, and a displacement value D.

Next, at S14, the difference value output unit 14 calculates a difference value AB between the displacement value A and the displacement value B, a difference value BC between the displacement value B and the displacement value C, a difference value CD between the displacement value C and the displacement value D, and a difference value DA between the displacement value D and the displacement value A.

Next, at S15, the abnormality detector 15 determines whether the respective difference values are less than or equal to the acceptable values or not. When there is no difference value exceeding the acceptable values, the calibration value is updated (S16). When there is a difference value exceeding the acceptable value, it is determined that there is an abnormality and a foreign matter position is detected (S17), and the measurement region is cleaned (S18).

Thus, also in the calibration method and the non-transitory computer-readable storage medium storing the calibration program of the tool sensor 7 of the above-described embodiment 2 and the machining center, it is allowed to detect the attachment of the foreign matter on the tool sensor 7 during processing without needing a visual observation operation by an operator or a special device. Thus, while reducing a workload of an operator and reducing a time loss caused by an interruption of processing, it is allowed to check whether the tool sensor 7 is accurately calibrated.

In particular, since the difference values based on the tool sensor measurement values are calculated from the displacement values at the identical measurement positions, the effect of flatness and parallelism of the tool sensor 7 and the distal end of the reference tool 6 can be eliminated. Accordingly, the attachment of the foreign matter can be detected more accurately than the method in the embodiment 1.

A description of an embodiment 3 is provided below.

Figure 8:
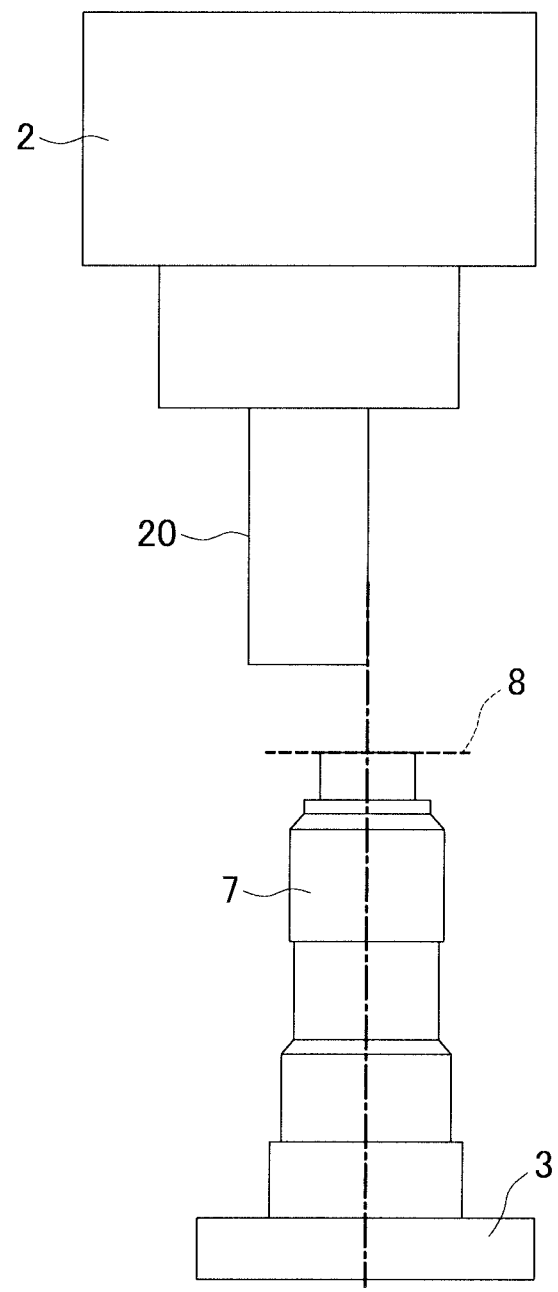
FIG. 8 is a schematic diagram of an exemplary device that performs a measurement in an embodiment 3.
Figure 9A:
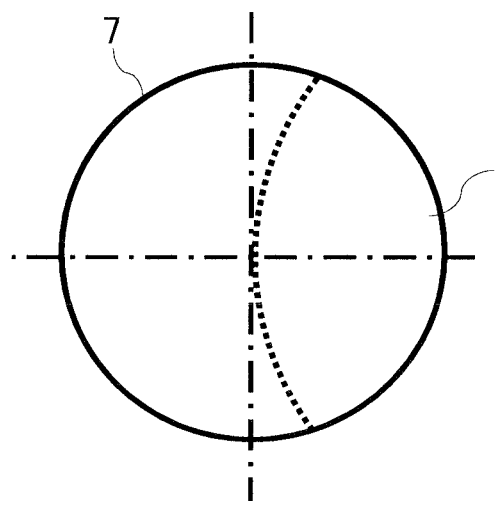
FIGS. 9A to 9D illustrate another example of measurement regions when viewed in a direction perpendicular to a reaction surface of a contact tool sensor in the embodiment 3.
Figure 9B:
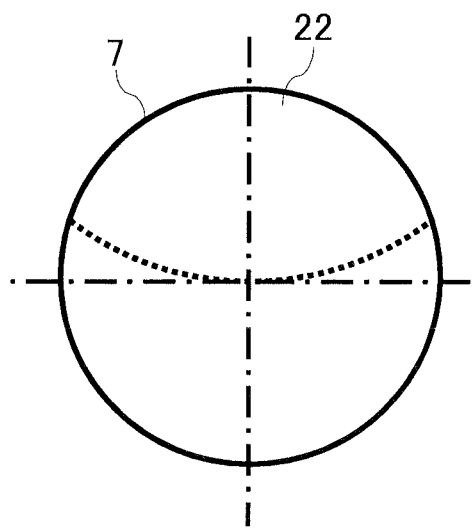
Figure 9C:
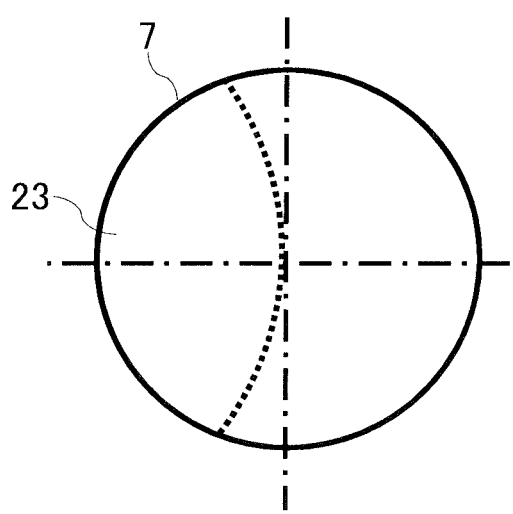
Figure 9D:
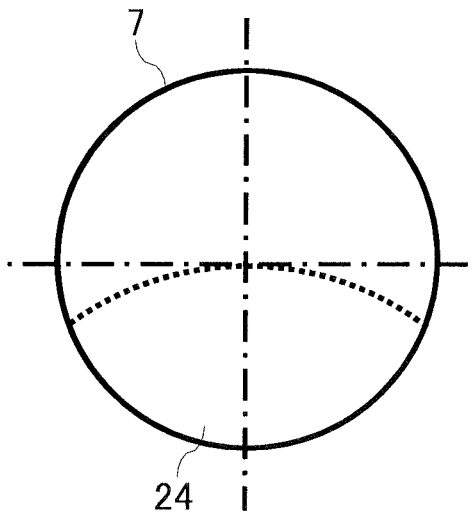

FIG. 8 is a schematic diagram of another example of the device that performs a measurement in the present disclosure. The main spindle head 2 is attached with a reference tool 20 thick enough to make regions with overlapped measurement regions when brought into contact with an upper surface of the tool sensor 7 at a plurality of positions.

FIGS. 9A to 9D illustrate another example of the measurement regions when viewed in the direction perpendicular to the reaction surface 8 of the tool sensor 7. FIG. 10 is a function block diagram illustrating another example of the portion related to the calibration of the tool sensor 7 in the numerical control unit 30. Here, the displacement value output unit is not provided, and it is in a configuration similar to that of the embodiment 1.

In the embodiment 3, the reference tool 20 is brought into contact only with a part of the reaction surface 8 of the tool sensor 7, and the relative positions of the reaction surface 8 of the tool sensor 7 are measured at two or more regions including the case where the measurement regions overlap. Here, measurements in four different measurement regions are shown as one example, and as illustrated in arc-shaped dotted lines in FIGS. 9A to 9D, measurement sections in the respective measurement regions are a tool sensor measurement section 21, a tool sensor measurement section 22, a tool sensor measurement section 23, and a tool sensor measurement section 24.

The procedure of the calibration method in the embodiment 3 is the same as that in FIG. 5. First, at S1, relative positions of the reaction surface 8 of the tool sensor 7 in the tool sensor measurement sections 21 to 24 are measured. The respective measurement results are a tool sensor measurement value A', a tool sensor measurement value B', a tool sensor measurement value C', and a tool sensor measurement value D'. The minimum value among the tool sensor measurement values A' to D' (the value at which the position of the main spindle head 2 when the tool sensor 7 reacts approaches closest to the tool sensor 7) is a minimum tool sensor measurement value. FIG. 10 illustrates the case where the tool sensor measurement value C' is the minimum tool sensor measurement value.

At S2, the difference value output unit 14 calculates a difference value A'C' between the minimum tool sensor measurement value and the tool sensor measurement value A', a difference value B'C' between the minimum tool sensor measurement value and the tool sensor measurement value B', and a difference value D'C' between the minimum tool sensor measurement value and the tool sensor measurement value D'.

At S3, the abnormality detector 15 determines whether the respective difference values are less than or equal to acceptable values or not. When there is no difference value exceeding the acceptable values, the calibration values are updated (S4). When there is a difference value exceeding the acceptable value, it is determined that there is an abnormality and a foreign matter position is detected (S5), and the measurement region is cleaned (S6).

Thus, also in the calibration method and the non-transitory computer-readable storage medium storing the calibration program of the tool sensor 7 of the above-described embodiment 3 and the machining center, it is allowed to detect the attachment of the foreign matter on the tool sensor 7 during processing without needing a visual observation operation by an operator or a special device. Thus, while reducing a workload of an operator and reducing a time loss caused by an interruption of the processing, it is allowed to check whether the tool sensor 7 is accurately calibrated.

A description of an embodiment 4 is provided below.

Figure 11:
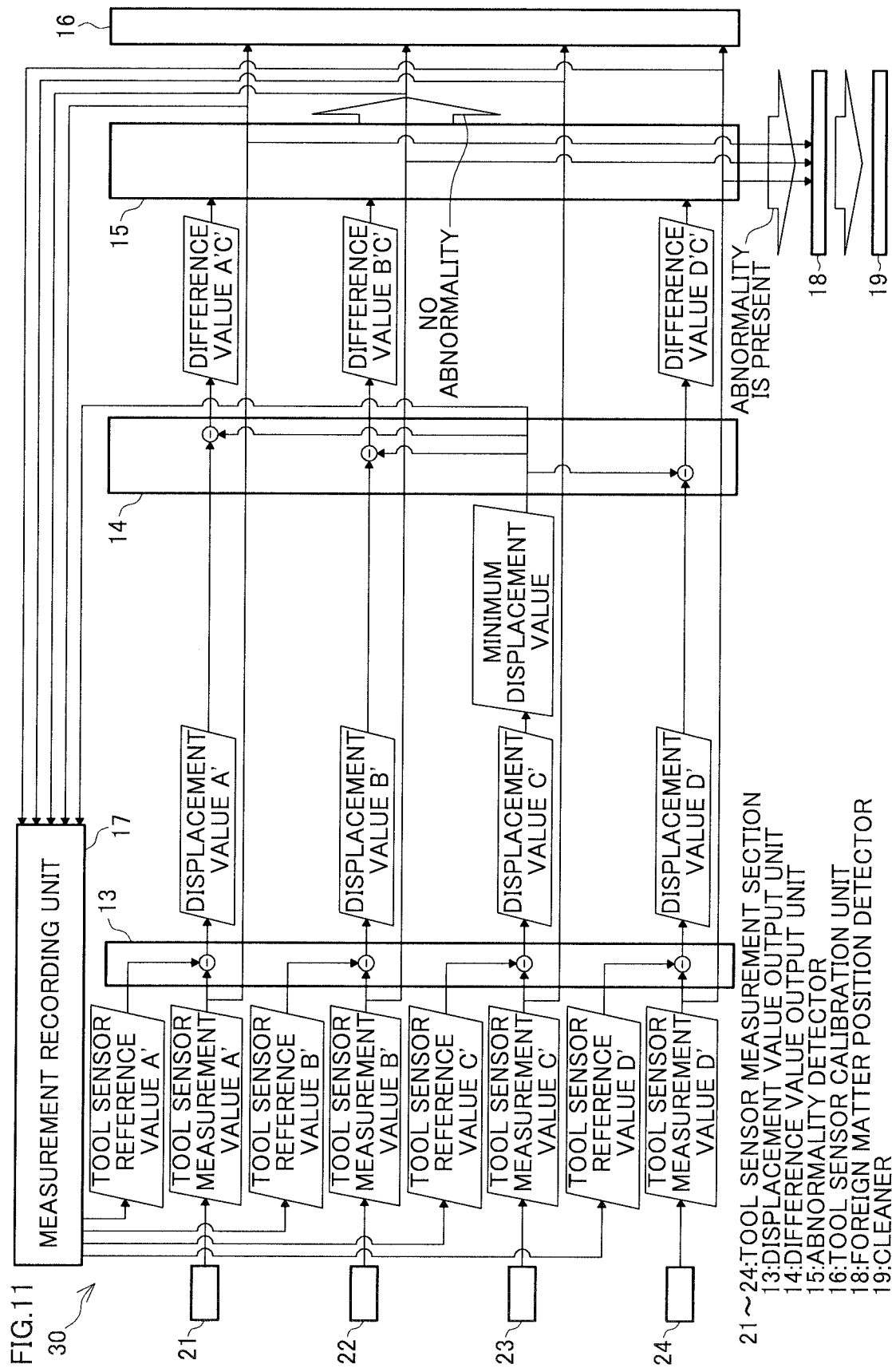
FIG. 11 is a function block diagram of a numerical control unit in an embodiment 4.

FIG. 11 is a function block diagram illustrating another example of the portion relating to the calibration of the tool sensor 7 in the numerical control unit 30. Here, the displacement value output unit 13 is included similarly to the embodiment 2.

A procedure of a calibration method in the embodiment 4 is the same as FIG. 7. First, at S11, in a state where the tool sensor measurement sections 21 to 24 and the reference tool 20 have no attached foreign matter, measurement position coordinates of the distal end of the reference tool 20 in respective measurement regions are measured. The measurement position coordinates are recorded in the measurement recording unit 17 as the normal tool sensor reference value A', tool sensor reference value B', tool sensor reference value C', and tool sensor reference value D'.

Next, at S12, the respective measurement regions of the tool sensor 7 are measured to obtain the tool sensor measurement values A' to D'.

Next, at S13, the displacement value output unit 13 calculates a difference between the tool sensor measurement value A' and the tool sensor reference value A', a difference between the tool sensor measurement value B' and the tool sensor reference value B', a difference between the tool sensor measurement value C' and the tool sensor reference value C', a difference between the tool sensor measurement value D' and the tool sensor reference value D', each of which is of the same measurement region. The respective differences are a displacement value A', a displacement value B', a displacement value C', and a displacement value D'. The minimum value among the displacement values is a minimum displacement value. FIG. 11 illustrates the case where the displacement value C' is the minimum value.

Next, at S14, the difference value output unit 14 calculates a difference value A'C' between the minimum displacement value and the displacement value A', a difference value B'C' between the minimum displacement value and the displacement value B', and a difference value D'C' between the minimum displacement value and the displacement value D'.

Next, at S15, the abnormality detector 15 determines whether the respective difference values are less than or equal to acceptable values or not. When there is no difference value exceeding the acceptable value, the calibration values are updated (S16). When there is a difference value exceeding the acceptable value, it is determined that there is an abnormality, and a foreign matter position is detected (S17), and the measurement region is cleaned (S18).

Thus, also in the calibration method and the non-transitory computer-readable storage medium storing the calibration program of the tool sensor 7 of the above-described embodiment 4, and the machining center, it is allowed to detect the attachment of the foreign matter on the tool sensor 7 during processing without needing a visual observation operation by an operator or a special device. Thus, while reducing a workload of an operator and reducing a time loss caused by an interruption of the processing, it is allowed to check whether the tool sensor 7 is accurately calibrated.

In particular, since the difference values are calculated from the displacement values at the identical measurement positions, the effect of flatness and parallelism of the tool sensor 7 and the distal end of the reference tool 20 can be eliminated. Therefore, the attachment of a foreign matter can be detected more accurately than the method in the embodiment 3.

In the methods indicated in the embodiments 1 and 2, when the differences of the tool sensor measurement values in the measurement regions including the regions where the measurement regions overlap are taken, the abnormality detector 15 does not detect an abnormality in some cases if a foreign matter is attached in the regions where the measurement regions overlap. However, the embodiment 4 can avoid the non-detection of abnormality.

Next, the cleaning by the cleaner 19 will be described in detail.

Figure 12:
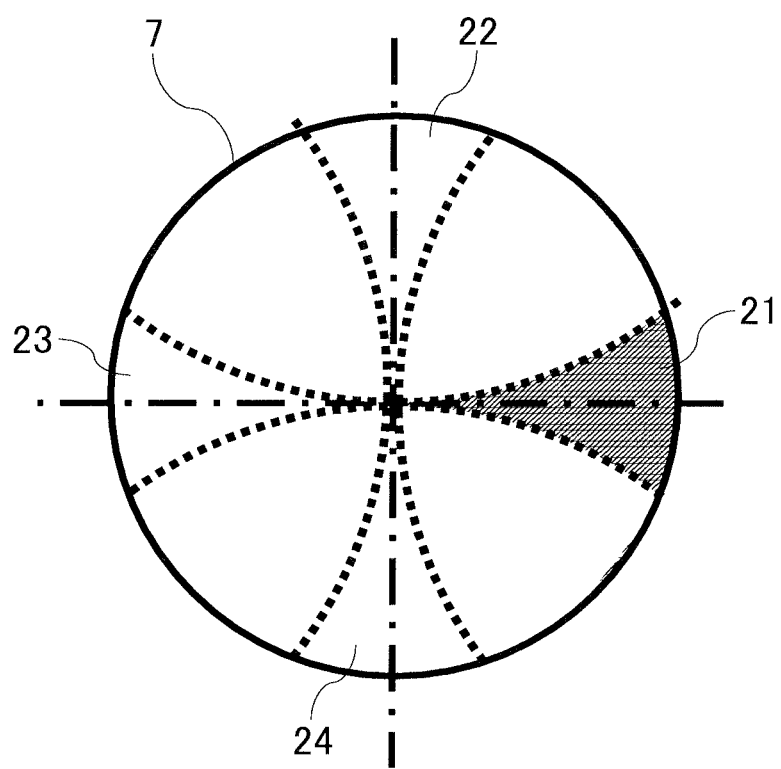
FIG. 12 illustrates an example showing a filled region in which a foreign matter is determined to be present by viewing in the direction perpendicular to the reaction surface of the contact tool sensor.

FIG. 12 illustrates an example showing a filled region in which a foreign matter is determined to be present by viewing in the direction perpendicular to the reaction surface 8 of the contact tool sensor 7. In the case where the measurement is performed at the four measurement regions illustrated, for example, in FIGS. 9A to 9D, when the abnormality detector 15 determines that only the tool sensor measurement value A of the tool sensor measurement section 21 has an abnormality, the foreign matter position detector 18 fills a region where a foreign matter is detected to be attached. In the case where only the difference including the tool sensor measurement value A has an abnormality, and the other differences are not determined to have an abnormality, the foreign matter is determined to be attached on a portion excluding the regions where the tool sensor measurement value B, the tool sensor measurement value C, and the tool sensor measurement value D are measured from the region where the tool sensor measurement value A is measured. In the case, the cleaner 19 can perform a process performing cleaning by, for example, a fluid injection on the region filled in FIG. 12.

Figure 13:
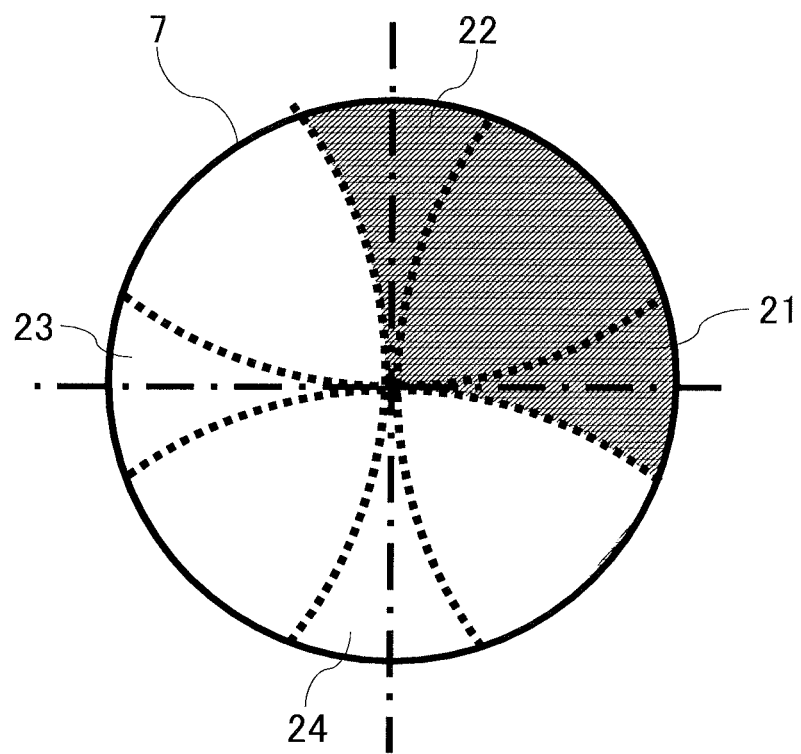
FIG. 13 illustrates another example showing a filled region in which a foreign matter is determined to be present by viewing in the direction perpendicular to the reaction surface of the contact tool sensor.

FIG. 13 illustrates another example showing a filled region in which a foreign matter is determined to be present by viewing in the direction perpendicular to the reaction surface 8 of the contact tool sensor 7.

In the case where, for example, the abnormality detector 15 determines that the tool sensor measurement values A and B of the tool sensor measurement section 21 and the tool sensor measurement section 22 have an abnormality, the foreign matter position detector 18 in the embodiments 3 and 4 fills a region where a foreign matter is detected to be attached. In the case where the tool sensor measurement value C is the minimum value, when the difference between the tool sensor measurement value A and the minimum tool sensor measurement value and the difference between the tool sensor measurement value B and the minimum tool sensor measurement value have an abnormality, and the tool sensor measurement value D is not determined to have an abnormality, a foreign matter is determined to be attached on a portion excluding the regions where the tool sensor measurement value C and the tool sensor measurement value D are measured from the regions where the tool sensor measurement value A and the tool sensor measurement value B are measured. In the case, the attachment of a foreign matter can be also determined when the foreign matter is attached on the region of measurement regions where the tool sensor measurement value A and the tool sensor measurement value B are measured overlap. Accordingly, the cleaner 19 can perform cleaning by, for example, a fluid injection on the region filled in FIG. 13.

However, in each embodiment, the cleaning of the tool sensor 7 by the cleaner 19 may be performed on the whole upper surface of the tool sensor 7, not only limited to the measurement region determined to have the attached foreign matter.

On the other hand, in each embodiment, after cleaning as the result of the presence of abnormality, the measurement region that has been cleaned may be measured again. A new difference value may be calculated by the difference value output unit 14 based on the obtained tool sensor measurement value. The process to determine again the presence/absence of an abnormality may be repeated by the abnormality detector 15.

Figure 14:
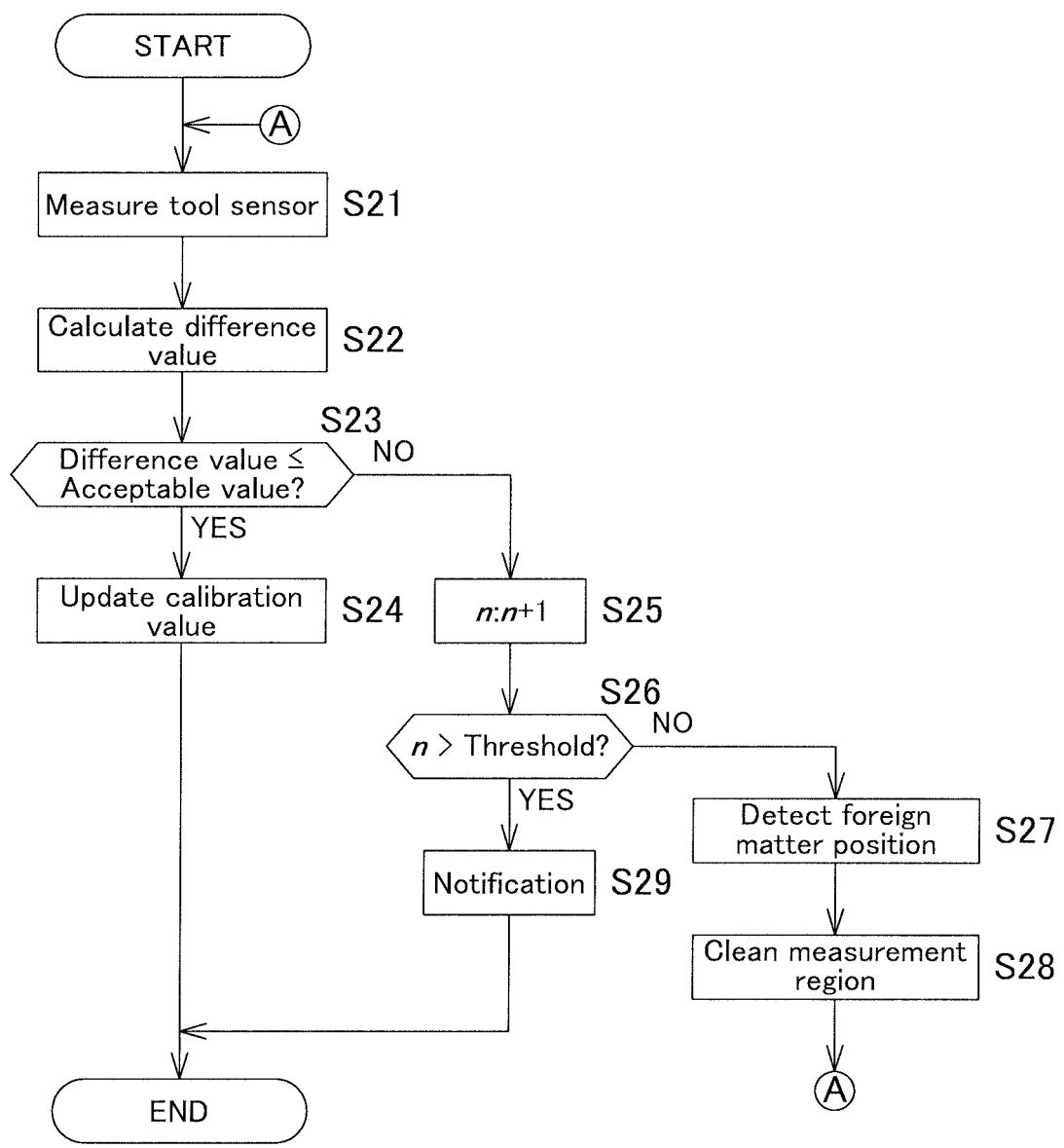
FIG. 14 is a flowchart of a modification example of the calibration method of the contact tool sensor.

FIG. 14 is a flowchart illustrating an example that repeats the process to determine the presence/absence of an abnormality again. S21 to S24 are the same process as those in FIG. 5, and when it is determined that there is an abnormality at S23, the number n determined at S25 is counted.

Next, at S26, it is determined whether the counted number n exceeds a predetermined threshold or not. When the number n does not exceed the threshold, a foreign matter position is detected at S27, and after cleaning the measurement region at 528, the tool sensor is measured again at S21 and the subsequent process is repeated. On the other hand, when the number n exceeds the threshold in the determination at S26, a notification, such as an alarm, is made at S29 (a notification step), and the process is terminated.

When the flowchart in FIG. 14 is performed in the embodiment 3 and/or the embodiment 4, a process to record the tool sensor reference values is added before the measurement of the tool sensor, and a process to calculate the displacement values is added after the measurement of the tool sensor. Accordingly, at the difference value output step at S22, the difference with the minimum tool sensor measurement value recorded in the measurement recording unit 17 or the difference with the minimum displacement value recorded in the measurement recording unit 17 is taken.

Other than the above, in each embodiment, the positions to measure the tool sensor are not limited to four. Since the difference value can be calculated with two or more positions, the number of the positions can be increased and decreased as necessary.

The shape of the tool sensor is also not limited to the above-described embodiment. For example, the reaction surface may have a shape other than the circular shape in plan view.

The present disclosure is applicable to a machine tool other than the machining center.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities, in particular, limits of value ranges disclose every possible intermediate value or intermediate entity for the purpose of original disclosure as well as for the purpose of restricting the claimed invention.

The invention claimed is:

1. A method for calibrating a positional relation between a main spindle and a contact tool sensor attached to a table in a machine tool, the machine tool having three or more translational axes, the main spindle to which a tool for processing a workpiece is mountable, the table, a numerical control unit that controls the translational axes and the main spindle, and the contact tool sensor having a reference surface, which is a flat planar surface, that measures the tool being mounted to the main spindle, the method comprising:
    mounting a reference tool on the main spindle and obtaining measurement position coordinates as respective tool sensor measurement values, the measurement position coordinates being of a distal end of the reference tool in at least two different measurement regions on the reference surface of the contact tool sensor;
    outputting difference values based on a difference between the respective tool sensor measurement values;
    determining an abnormality when the difference values are compared with preliminarily set acceptable values and at least one of the difference values are out of the acceptable values, otherwise an abnormality is not determined; and
    calibrating a positional relation between the main spindle and the contact tool sensor based on the respective tool sensor measurement values when the abnormality is not determined at the determining of abnormality.

2. The calibration method of the contact tool sensor in the machine tool according to claim 1, further comprising cleaning the reference surface of the contact tool sensor when the abnormality is determined at the determining of abnormality.

3. The calibration method of the contact tool sensor in the machine tool according to claim 2, wherein
the cleaning includes cleaning at least the measurement region where the tool sensor measurement value related to the difference value out of the acceptable value is obtained.

4. The calibration method of the contact tool sensor in the machine tool according to claim 2, wherein
the mounting of a reference tool and obtaining of measurement position coordinates, the outputting of difference values, and the determining of abnormality are performed again after performing the cleaning; and
when the abnormality is determined at the determining of abnormality again, a process of performing the cleaning again is repeated; and
when the number of determinations of the abnormality at the determining of abnormality reaches a predetermined threshold, the process is terminated and notifying thereof is performed.

5. The calibration method of the contact tool sensor in the machine tool according to claim 1, further comprising:
recording measurement position coordinates of the distal end of the reference tool in the plurality of measurement regions as respective tool sensor reference values while no foreign matter is attached on the reference surface of the contact tool sensor or the reference tool, before performing the outputting of difference values; and
outputting differences between the respective tool sensor reference values and the respective tool sensor measurement values in the measurement regions same as the measurement regions of the respective tool sensor reference values, as respective tool sensor displacement values, wherein
the outputting of difference values includes outputting the differences between the respective tool sensor displacement values as the difference values.

6. The calibration method of the contact tool sensor in the machine tool according to claim 1, wherein
by defining a direction in which the main spindle approaches the contact tool sensor is a negative direction and a minimum value among the respective tool sensor measurement values is a minimum tool sensor measurement value, the outputting of difference values includes outputting differences between the tool sensor measurement values other than the tool sensor measurement value related to the minimum value and the minimum tool sensor measurement value as the difference values.

7. The calibration method of the contact tool sensor in the machine tool according to claim 1, further comprising:
recording measurement position coordinates of the distal end of the reference tool in the plurality of measurement regions as respective tool sensor reference values while no foreign matter is attached on the reference surface of the contact tool sensor or the reference tool, before performing the outputting of predetermined difference values; and
outputting differences between the respective tool sensor reference values and the respective tool sensor measurement values in the measurement regions same as the measurement regions of the respective tool sensor reference values, as respective tool sensor displacement values, wherein
by defining a direction in which the main spindle approaches the contact tool sensor is a negative direction and a minimum value among the respective tool sensor displacement values is a minimum tool sensor displacement value, the outputting of difference values includes outputting differences between the tool sensor displacement values other than the tool sensor displacement value related to the minimum value and the minimum tool sensor displacement value as the difference values.

8. A non-transitory computer-readable storage medium storing a calibration program of a contact tool sensor in a machine tool having three or more translational axes, a main spindle to which a tool is mountable, a table, and a numerical control unit that controls the translational axes and the main spindle, wherein
the calibration program causes the numerical control unit to perform the calibration method of the contact tool sensor according to claim 1 while a reference tool is mounted on the main spindle and the contact tool sensor is installed to the table.

9. A machine tool having three or more translational axes, a main spindle to which a tool for processing a workpiece is mountable, a table, a numerical control unit that controls the translational axes and the main spindle, and a contact tool sensor having a reference surface, which is a flat planar surface, that measures the tool being mounted to the main spindle, the machine tool comprising:
a tool sensor measurement unit that obtains measurement position coordinates as respective tool sensor measurement values while a reference tool is mounted on the main spindle and the contact tool sensor is installed to the table, the measurement position coordinates being of a distal end of the reference tool in at least two different measurement regions on the reference surface of the contact tool sensor;
a difference value output unit that outputs difference values based on a difference between the respective tool sensor measurement values;
an abnormality detector that determines an abnormality when the difference values are compared with preliminarily set acceptable values and at least one of the difference values are out of the acceptable values, otherwise an abnormality is not determined; and
a tool sensor calibration unit that calibrates a positional relation between the main spindle and the contact tool sensor based on the respective tool sensor measurement values when the abnormality is not determined by the abnormality detector.

* * * * *